United States Patent [19]

Milunas

[11] Patent Number: 5,463,551
[45] Date of Patent: Oct. 31, 1995

[54] INTEGRATED TRACTION CONTROL SYSTEM

[75] Inventor: Rimas S. Milunas, Rochester Hills, Mich.

[73] Assignee: Saturn Corporation, Troy, Mich.

[21] Appl. No.: 299,986

[22] Filed: Sep. 2, 1994

[51] Int. Cl.$^6$ .................... B60K 28/16; B60T 8/58
[52] U.S. Cl. .................. 364/426.02; 364/426.03; 364/424.1; 180/197; 123/417
[58] Field of Search .................... 364/426.01, 426.03, 364/424.1, 426.02; 180/197; 123/416, 417, 406, 407, 411, 205, 297, 305; 303/112, 113.2

[56] References Cited

U.S. PATENT DOCUMENTS

| | | | |
|---|---|---|---|
| 4,951,773 | 8/1990 | Poirier et al. | 180/197 |
| 5,025,881 | 6/1991 | Poirier et al. | 180/197 |
| 5,046,009 | 9/1991 | Abo et al. | 364/426.02 |
| 5,047,940 | 10/1991 | Onaka et al. | 364/426.02 |
| 5,060,746 | 10/1991 | Nobumoto et al. | 180/197 |
| 5,184,577 | 2/1993 | Kato et al. | 123/90.15 |
| 5,201,383 | 4/1993 | Kitagawa et al. | 364/426.03 |
| 5,213,178 | 5/1993 | Polidan et al. | 123/417 |
| 5,238,081 | 8/1993 | Maeda et al. | 364/426.03 |
| 5,265,693 | 11/1993 | Rees et al. | 364/426.01 |
| 5,282,137 | 1/1994 | Suzuki et al. | 364/426.03 |
| 5,287,279 | 2/1994 | Anan | 364/426.02 |

Primary Examiner—Kevin J. Teska
Assistant Examiner—Tan Nguyen
Attorney, Agent, or Firm—Michael J. Bridges

[57] ABSTRACT

A traction control approach provides for smooth and precise control of engine output torque to reduce slip of the driven wheels during acceleration thereof through an integrated control of engine ignition timing and engine fueling in automotive vehicles regardless of the type of transmission used in the vehicle. In the presence of a slip condition at the vehicle driven wheels, ignition timing is adjusted to attempt to alleviate the condition. If limits on ignition timing authority, established for catalytic converter overtemperature protection, are being approached or exceeded, a single fuel injector is disabled, ignition timing is advanced to buffer the significant fuel-based torque loss, and the timing authority is increased. Further injectors may be sequentially disabled in this manner if ignition timing again approaches or runs out of authority. Recovery from a compensated slip condition is provided through sequential enabling of any disabled injectors, with appropriate reduction in ignition authority and retarding of ignition timing following each re-enabled injector. Accommodation is made for the effects of any transmission shifting that may occur.

12 Claims, 11 Drawing Sheets

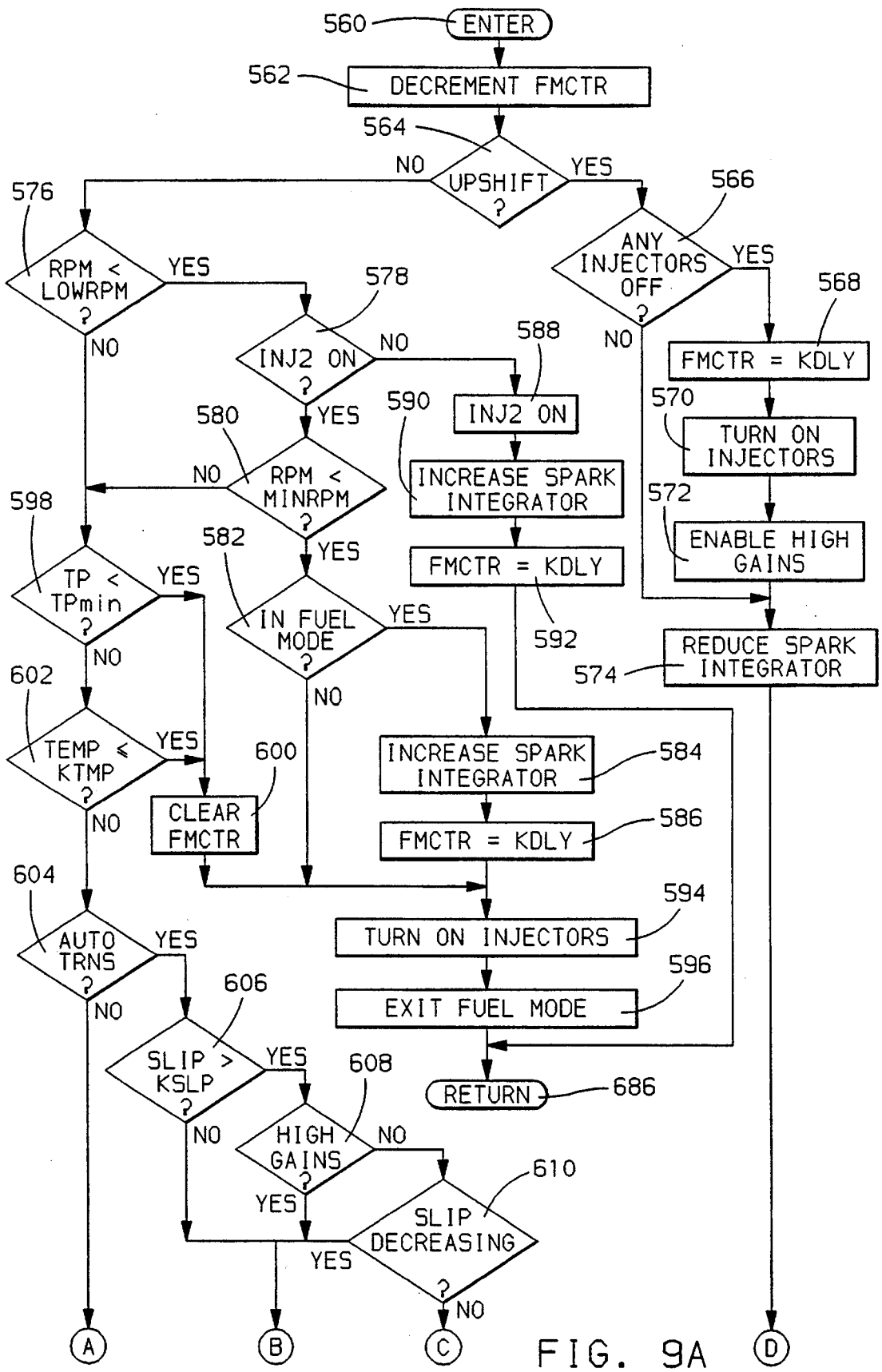

INTEGRATED TRACTION CONTROL SYSTEM

FIELD OF THE INVENTION

This invention relates to automotive engine torque control and, more particularly, to an integrated traction control method to reduce slip in the driven wheels of an automotive vehicle.

BACKGROUND OF THE INVENTION

Automotive traction control methods are known generally for reducing sensed or estimated slip in the driven wheels of an automotive vehicle during positive torque driving maneuvers, through a controlled reduction in engine output torque. The reduction is commonly made through fuel cutoff to certain cylinders of the engine, through braking of the driven wheels, or through adjustment to the throttle which controls air inlet to the engine. Fuel cutoff may not provide for smooth traction control in certain conventional fuel injection systems, such as throttle body injection systems or simultaneous multipoint injection systems. Brake control can require significant additional hardware to provide automatic braking, and may not provide smooth traction control. Throttle control can add significant cost to the vehicle to provide a means to override a mechanically-positioned throttle valve.

To overcome the shortcomings of these conventional traction control approaches, an integrated approach has been proposed, such as described in U.S. Pat. No. 5,265,693, assigned to the assignee of this invention, in which traction control in an automotive vehicle having an automatic transmission is provided including a control of transmission position. Such integrated control provides for smooth, low cost, and simple traction control in vehicles having automatic transmissions. However, the advantages of such an integrated approach are not applicable to the large number of automotive vehicles having manual transmissions.

Accordingly, it would be desirable to provide the benefits of an integrated traction control approach applicable to Vehicles with manual transmissions or, to vehicles regardless of the type of transmission used thereby.

SUMMARY OF THE INVENTION

The present invention provides the desired benefit through a traction control system integrating benefits of a number of control functions and not reliant by any one type of vehicle transmission.

More specifically, an integrated approach to traction control is provided that does not rely on automatic shifting of the vehicle transmission, and yet provides a smooth, low cost, simple yet effective traction control. A hierarchy of control is provided including engine ignition timing control and individual cylinder fuel control to reduce torque at the driven wheels of the vehicle. Spark retard is provided initially to reduce wheel slip. If the spark retard is approaching the limit necessary to hold down catalytic converter temperature, fuel is shut off to one cylinder of the engine. The spark retard is then reduced to minimize the perceptibility of the loss in torque of the driven wheels, consistent with a desire for smooth traction control. The catalytic converter protection-based spark retard limit is also increased after the fuel shut-off, as the disabled cylinder acts as an air pump, driving air through the engine to the catalytic converter to reduce the temperature thereof. The converter than may tolerate more spark retard without overheating.

Spark retard may be further increased responsive to a persistent wheel slip condition after the described fuel shutoff condition. If further increases in retard cause the retard to approach the adjusted limit after a predetermined period of time, fuel is shut off to a second cylinder, the spark retard is again reduced and the spark retard limit is further increased.

Spark retard is then further modulated in response to further sensed slip conditions. When the retard drops below a predetermined threshold value for a period of time, the cylinders may be enabled one at a time with contemporaneous proper adjustments made to the spark retard and the spark retard limits.

In a further aspect of this invention, engine operating parameters are monitored throughout the traction control operations and responsive action taken to ensure smooth uninterrupted operation of the vehicle. In yet a further aspect of this invention, change in transmission gear position is detected and upon detecting an upshift maneuver, any disabled injectors are re-enabled. Spark retard may then be reduced to smooth the fuel mode transition. In yet a further aspect of this invention, control of the position of the transmission may be provided in applications having automatic transmissions when the spark retard approaches a predetermined limit value. Fuel injectors will not be disabled after such an upshift operation until after a delay period, such as by restricting such disabling until the retard actually exceeds the limit value. This provides the transmission control ample time to affect the detected slip condition.

BRIEF DESCRIPTION OF THE DRAWINGS

The invention may be best understood by reference to the preferred embodiment and to the drawings in which.

INCORPORATION BY REFERENCE

Figure 1:
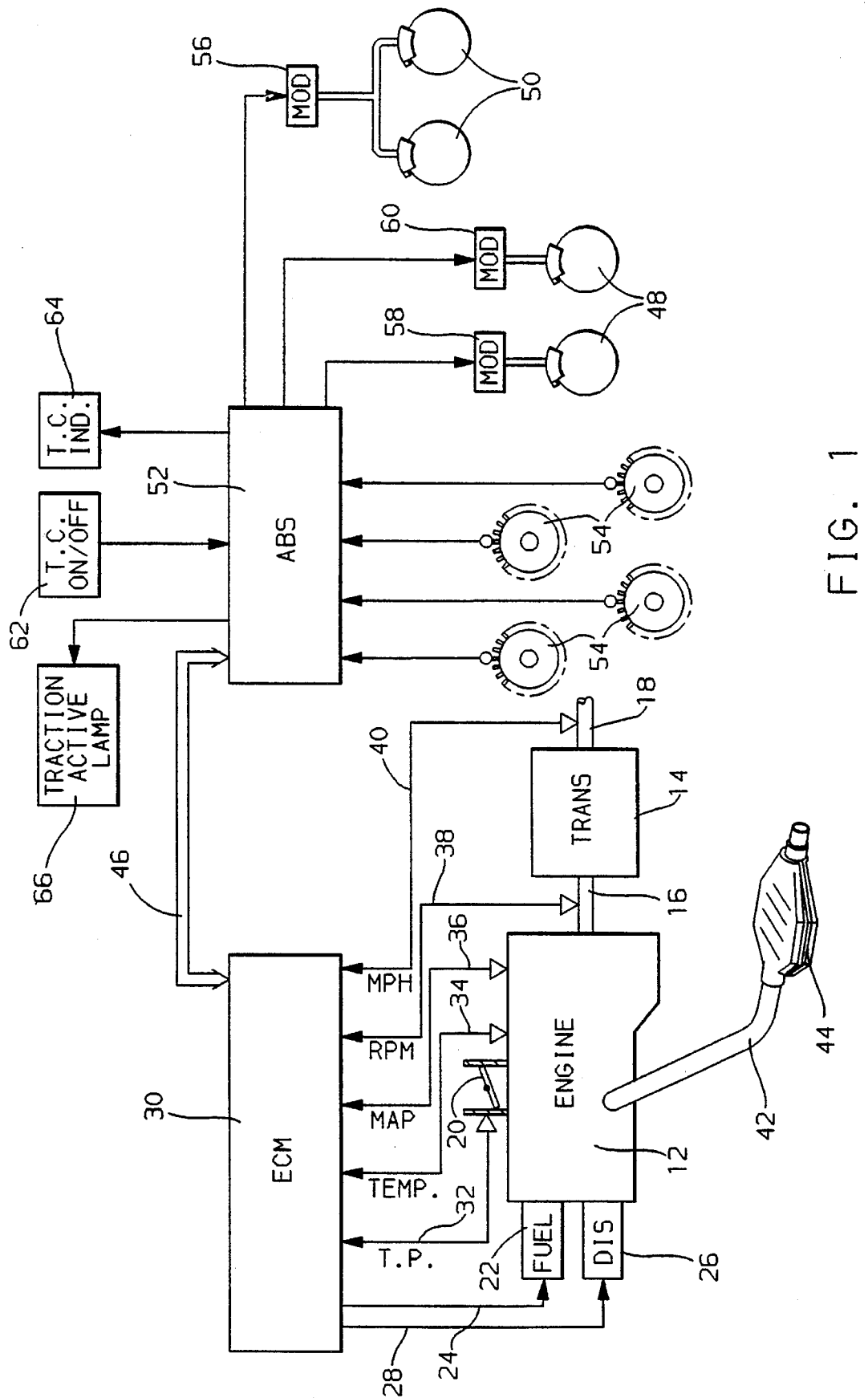
FIG. 1 diagrams the hardware used to carry out the traction control in accord with the preferred embodiment of this invention.

U.S. Pat. No. 5,265,693 is hereby incorporated herein by reference.

DESCRIPTION OF THE PREFERRED EMBODIMENT

The following general description of the operation of the routines of FIGS. 1–10 is provided followed by a description of the specific steps of the routines of FIGS. 1–10 used to carry out this invention in accord with the preferred embodiment. Generally, a discrete time control function operates to adjust engine ignition timing in response to a sensed or estimated wheel slip condition in the driven wheels of the vehicle. The timing retard is periodically examined to determine if it is approaching or has reached a limit value, indicating it is likely to or has exceeded a predetermined degree of authority. If such authority is likely to or has been exceeded, one fuel injector for providing fuel to one or more of the cylinder of the engine is disabled.

After disabling the injector, engine ignition timing retard is reduced by a calibratable value and an ignition retard limit defining the maximum tolerable amount of retard is increased. Ignition timing retard is reduced to minimize the torque loss feel of disabling at least one of the engine cylinders. This provides a smooth or more gradual change in torque at the driven wheels of the vehicle through a torque loss swap between fuel and ignition timing, wherein torque may be added through the advance in ignition timing to lessen the effect of the granular torque loss corresponding to a suddenly disabled fuel injector. The ignition retard limit provides for protection of a catalytic treatment device, such as a catalytic converter, from an overtemperature condition, and may be increased after disabling the injector due to the cooling effect provided by fresh air passing directly to the converter through the cylinder or cylinders corresponding to the disabled injector.

A delay time is imposed after disabling the injector and adjusting the spark retard and the spark retard limit, during which spark retard is periodically adjusted through the action of the described discrete time control function. At the conclusion of the delay time the spark retard is again examined to determine whether it is approaching or within a threshold of the ignition retard limit value provided for catalytic converter protection. If the spark retard is approaching or within a predetermined threshold of the ignition retard limit, additional fuel injection may be disabled, such as by disabling yet another fuel injector providing fuel to at least one engine cylinder, the spark retard may be again reduced to provide for smooth control of engine torque and the maximum retard limit may be further increased in accord with the cooling effect corresponding to the disabled injector.

Torque recovery is provided upon recovering from a wheel slip condition by enabling any disabled fuel injectors one at a time with predetermined timed spacing between the enabling of spaced injectors. Upon enabling an injector, the spark retard may be increased by a calibratable value to lessen the impact of the significant change in torque at the driven vehicle wheels upon recovery of a previously disabled fuel injector. This provides for a smooth torque recovery approach. Other cases in which torque recovery is provided are also addressed.

Turning to the specific hardware and operational steps used to carry out this invention in accord with the preferred embodiment, FIG. 1 illustrates generally a motor vehicle drivetrain including a spark ignition internal combustion engine 12 having an output shaft 16 for driving a conventional manual transmission TRANS 14 which transmission has output shaft 18 for driving the vehicle driven wheels, such as the front vehicle wheels in a front wheel drive application. Through manual positioning of a gear select lever, a vehicle operator direct the transmission to establish one of a small set of gear ratios between the engine output shaft 16 and the transmission output shaft 18. For example, the transmission may include four forward gears and one reverse gear, a park position and a neutral position.

Throttle valve 20 is positioned by the vehicle operator to control airflow into the engine 12. The inlet air is combined with fuel metered to the engine via fuel module 22, which may include one or more conventional fuel injectors, one of which is dedicated to admitting fuel to a corresponding engine cylinder in this embodiment. A pulse width command is passed on signal line 24 to the fuel module 22 for use by the module in actuating the fuel injectors. Ignition of the fuel-air mixture is provided through operation of a direct ignition system DIS 26 which operates to provide timed energization of a plurality of spark plugs in response to an ignition control signal on signal line 28, wherein each of the plurality is positioned in a corresponding engine cylinder. As is generally understood in the art, the time of energization for each cylinder is provided relative to the top dead center position of a piston in that cylinder.

An engine controller ECM 30 receives inputs from a series of sensors and, through a series of engine control operations, generates and times the issuance of actuator commands for a series of conventional engine control actuators, as is generally understood in the art. Included in the sensor inputs is a throttle position signal TP on signal line 32, which indicates the rotational position of throttle valve 20, engine coolant temperature signal TEMP on signal line 34, engine intake manifold absolute air pressure signal MAP on signal line 36, engine speed signal RPM on signal line 38 which indicates the rate of rotation of engine output shaft 16, and vehicle speed signal MPH on signal line 40, which indicates the rate of rotation of transmission output shaft 18 and which is proportional to vehicle speed.

Included in the actuator commands generated and issued at appropriate times by controller 30 are the fuel injection pulsewidth on signal line 24, the spark timing command on signal line 28. The controller may be a conventional single chip microcontroller having central processing, memory, and input/output units, as well as other units for carrying out control operations as is generally understood in the art.

Through engine operation, intake air and fuel are combined and combusted, and exhaust gas by-products from such combustion guided from the engine through exhaust gas conduit 42 to catalytic converter 44 for catalytic treatment therein. The treated exhaust gas may then be released to the atmosphere. Ignition timing is controlled to a desired position, generally as close as possible to an MBT setting which provides for maximum engine output torque without causing engine pre-ignition or pre-detonation. The MBT setting may be stored in controller 30 memory as a calibrated function of engine speed and intake manifold absolute pressure. In accord with this invention, controlled retard and advance of ignition timing provides for a controlled reduction in engine output torque to reduce and ultimately to recover from a sensed wheel slip condition.

To minimize excessive wheel slip during vehicle braking maneuvers, an antilock brake system is included having a conventional antilock braking controller ABS 52, which receives wheel speed inputs from the vehicle wheels 54, processes the wheel speed inputs, such as in conjunction with the controller 30 with which the ABS 52 communicates via a conventional serial communication link 46, and issues braking commands to brake pressure modulators, including modulators 58 and 60 for individual control of the brake pressure applied to the front vehicle wheels 48, and modulator 56 for control of the brake pressure applied to the rear vehicle wheels 50. The brake modulators may take the form of a motor driven fluid pressure modulator which may supplement manual applied brake pressure to relieve an sensed wheel slip condition, such as may be indicated by a degree of difference between a sensed individual wheel speed and a sensed or estimated vehicle speed.

The vehicle operator, through manual positioning of a binary switch 62 located in the vehicle interior within reach of a vehicle operator, may enable or disable the traction control of the present embodiment. The switch 62 is provided as an input to antilock brake system controller ABS 52. When the switch 62 is positioned to enable traction control, an indicator 64 may be energized, which indicator may be a simple lamp positioned in the vehicle operator's field of view, to inform the operator that traction control is enabled. Once enabled, traction control operations, as will be described, may act to reduce the torque applied to the vehicle driven wheels. For the duration of any such torque reduction, the ABS 52 may provide an output signal suitable to energize or illuminate traction control indicator 66, which may include a simple lamp positioned to notify the vehicle operator of such traction control activity.

Figure 2:
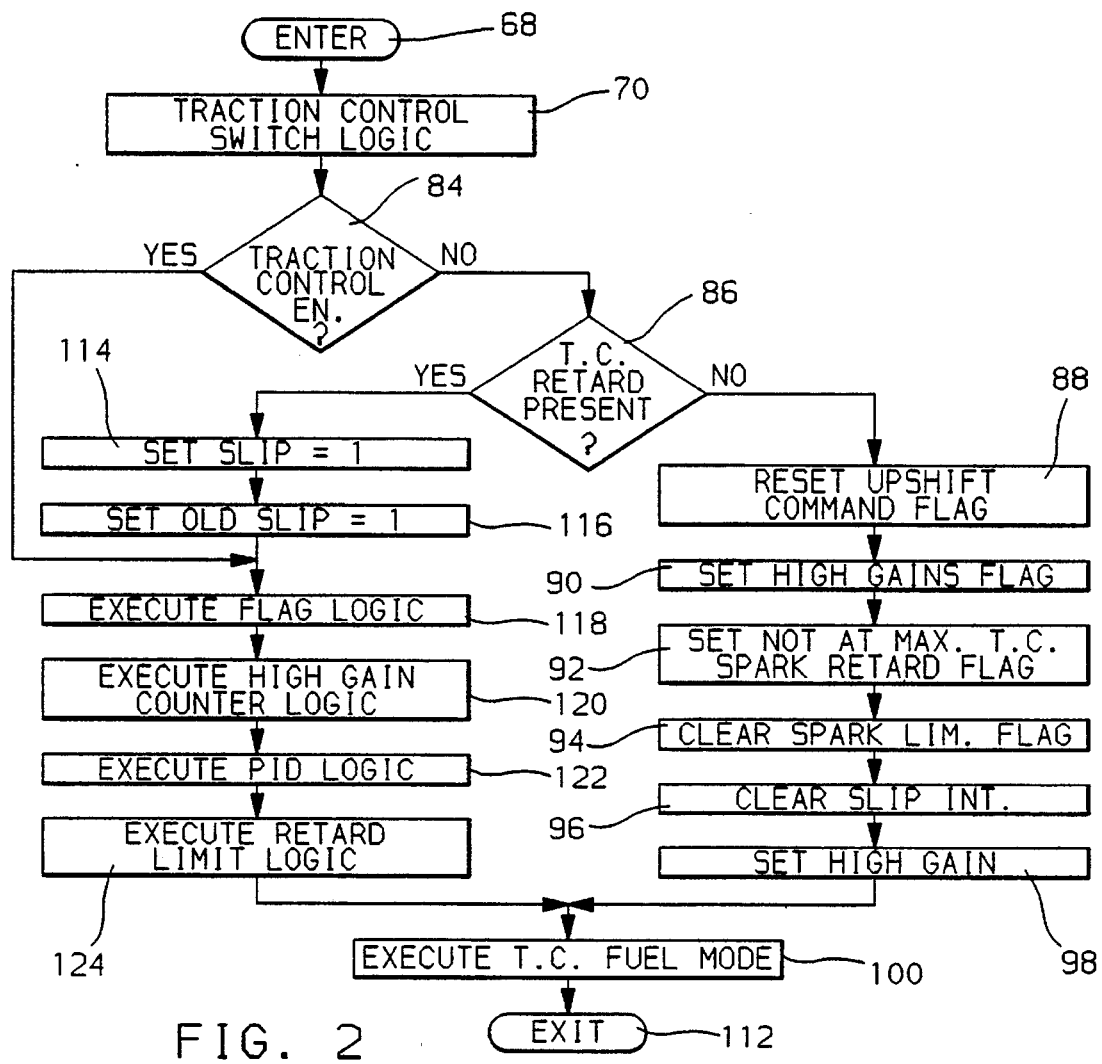
FIGS. 2 to 10 are computer flow diagrams illustrating a series of operations used to carry out this invention in accord with the preferred embodiment.

The routines of FIGS. 2–10 describe specific steps executed by the ECM 30 in an order to be described, to carry out the traction control of the preferred embodiment of this invention. Specifically, the routine of FIG. 2 is periodically executed, such as approximately every 100 milliseconds during ECM 30 operation. For example, a conventional controller time-based interrupt may be set up to occur about every 100 millisecond while the controller 30 is operating, and may be serviced, at least in part, through the operations of the routine of FIG. 2.

The operations of the controller 30 in carrying out the specific steps of the routine of FIG. 2 generally correspond to the manner of carrying out the routine of FIG. 2 of the patent incorporated herein by reference. Specifically, when initiated upon occurrence of the described conventional time-based interrupt, the routine of FIG. 2 is entered at point 68 and proceeds next to a step 70 to execute a traction control switch logic subroutine to determine whether traction control is enabled based on a present measured engine speed and the current traction control active switch position, as set by the vehicle operator. The traction control switch logic subroutine is illustrated in FIG. 3, and is executed when called at the step 70 in the manner described for the FIG. 3 of the patent incorporated herein by reference.

Figure 3:
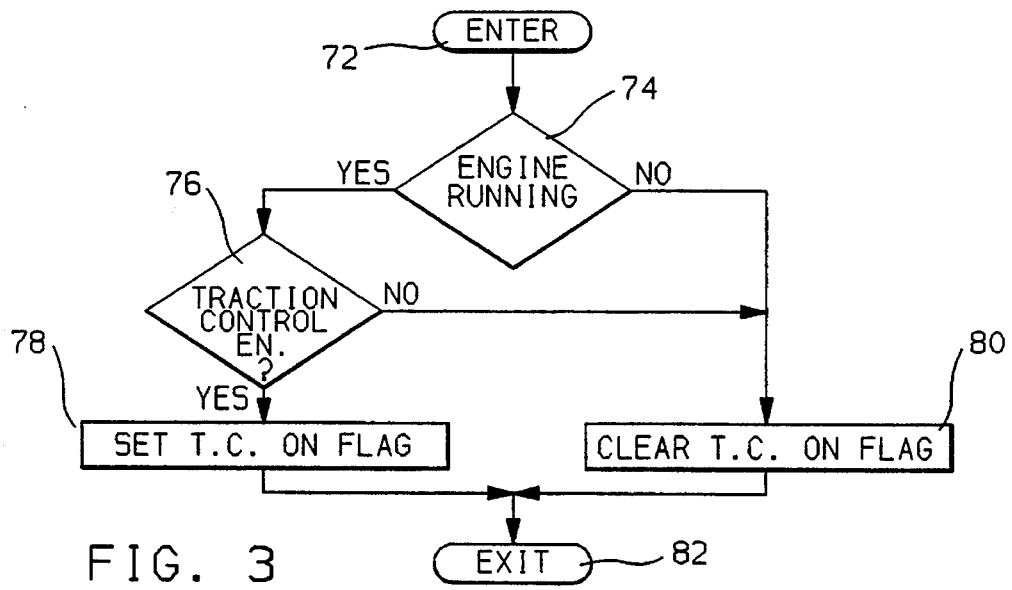
Figure 4:
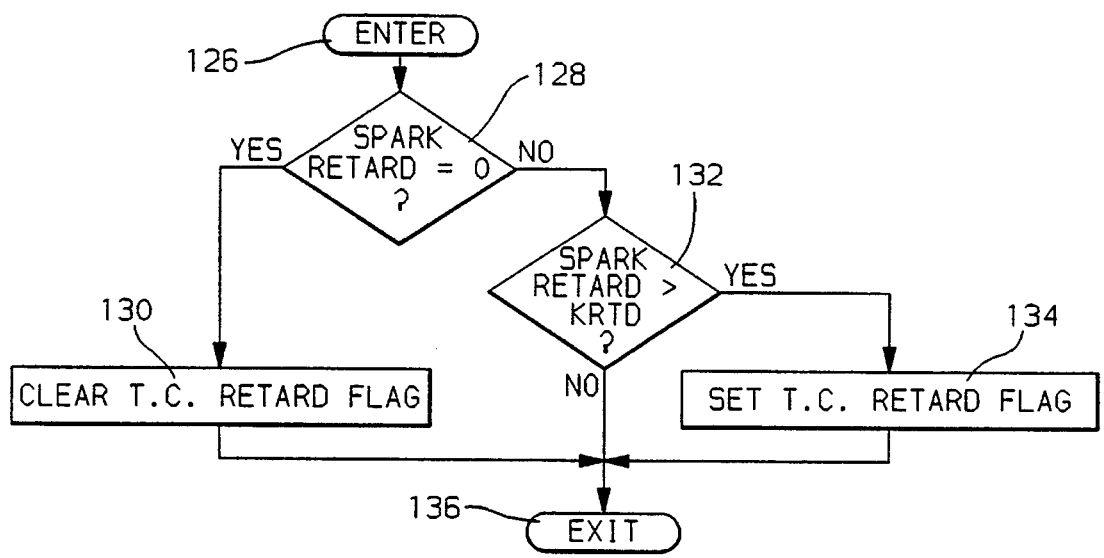

Upon completion of the routine of FIG. 3, the routine of FIG. 2 is re-entered and moves to a step 84 to sample the traction control "on" flag to determine whether traction control is enabled. If the flag indicates traction control is not enabled, the routine moves to a step 86 to determine whether spark timing is currently being retarded to reduce engine torque in response to a prior determined need for a wheel slip reduction. If spark timing is not currently being retarded, various initial conditions are established at the step 88–98, as described in the steps 88–98 of the routine of FIG. 2 of the patent incorporated herein by reference. After establishing such initial condition, the routine moves to a step 100 to execute a traction control fuel mode routine, as is illustrated in FIG. 9, to be described.

Returning to the step 86, if traction control-based spark retard is currently present while the traction control flag indicates traction control is not enabled at the step 84, as described, the routine moves to a step 114 to set slip to one and then to a step 116 to set old slip to one. Next, or if traction control was determined to be enabled at the step 84, the routine moves to steps 118–124 to control spark retard to provide for traction control in accord with this invention. Specifically, the routine first moves to a step 118 to execute flag logic by executing the routine illustrated in FIG. 4, in the manner described for the FIG. 4 of the patent incorporated herein by reference. The routine then executes high gain counter logic at the step 120 of FIG. 2, by carrying out the steps of the routine of FIG. 5, in the manner described for the FIG. 5 of the patent incorporated herein.

Figure 5:
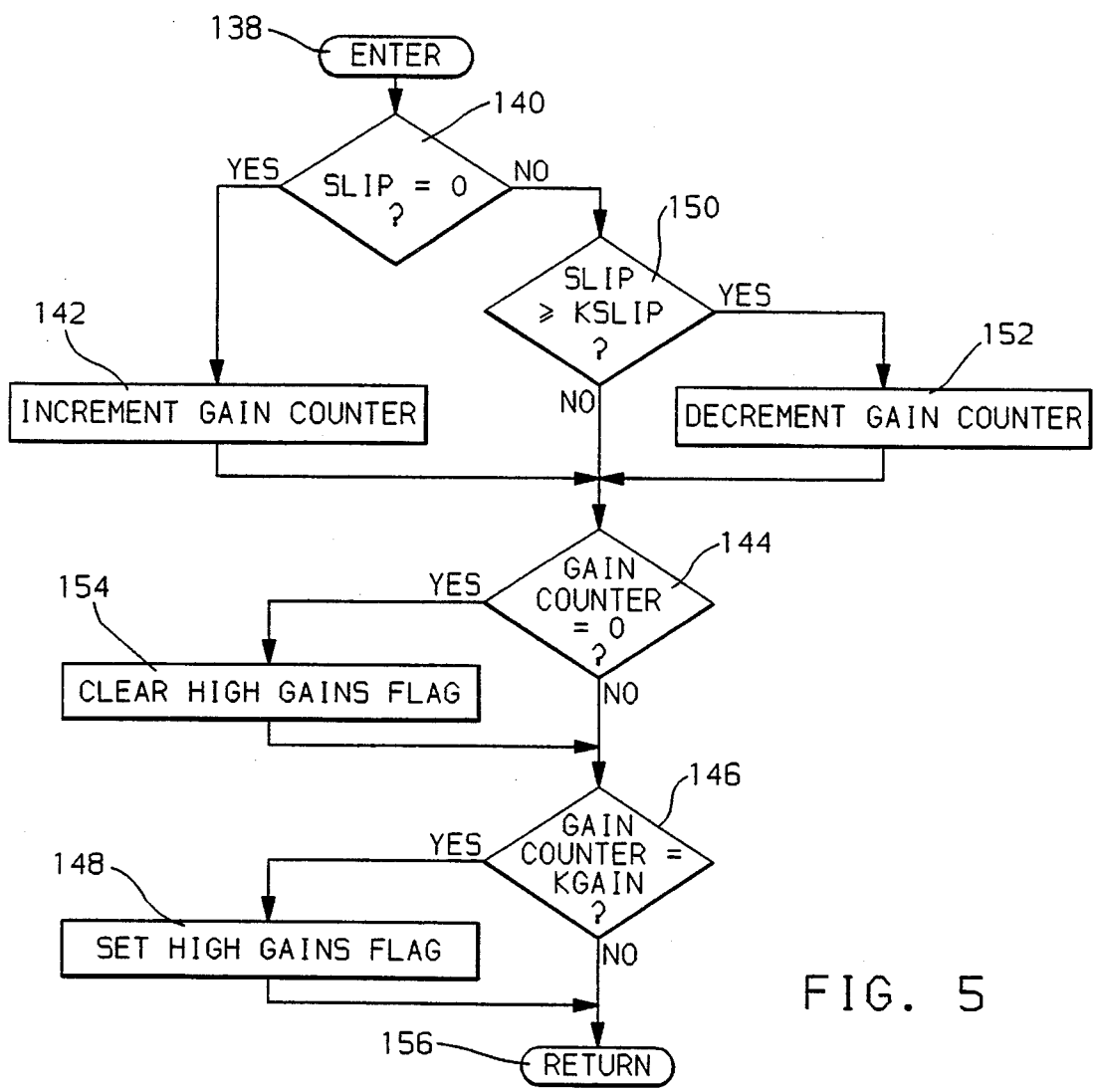

After executing the routine of FIG. 5, the routine of FIG. 2 is re-entered and moves to a step 122 to execute PID logic by carrying out the steps of the routine of FIG. 6 in the manner described for the routine of FIG. 6 of the patent incorporated herein. The routine of FIG. 6 generally provides for integral and proportional adjustment of ignition timing to reduce wheel slip error in a controlled manner. Wheel slip error is determined as a difference between a desired wheel slip and actual or measured wheel slip. Desired wheel slip is determined by carrying out the steps of the routine of FIG. 7 in the manner described in the patent incorporated herein. The routine of FIG. 7 is carried out during execution of the routine of FIG. 6.

Upon completion of the routine of FIG. 6, the routine of FIG. 2 is re-entered and moves to a step 124 to execute retard limit logic by carrying out the steps of the routine of FIG. 8. This limit logic provides a limit on the amount of spark retard to prevent a catalytic converter 44 (FIG. 1) overtemperature condition. Torque reduction may be provided through the traction control operations of this embodiment by retarding spark away from the MBT setting toward a spark retard limit. The limit is established to protect the converter. In the event the traction control-based spark retard approaches the limit, a fuel injector is disabled in the present embodiment, and the limit increased to account for catalytic converter cooling caused by the unburnt air passing through the cylinder having the disabled injector directly to the converter. Upon disabling the injector, the retard is reduced. If, through the traction control activity of this embodiment, the reduced spark retard again approaches the limit value, a second injector is disabled, the limit increased further, and the retard reduced again. Such provides a smooth torque reduction applicable to vehicles having either manual or automatic transmissions.

Turning to the specific steps of the routine of FIG. 8a, which is entered at a step 264 upon being called from step 122 of the routine of FIG. 2, the routine first moves to steps 266–270 to clear flags for use later in the routine. Specifically, an integrator increase flag is cleared or enabled at a step 266, an upshift command flag is cleared at a step 268, and a spark limited flag is cleared at a step 270. The routine then moves to a step 272 to reference a maximum tolerable spark retard from a predetermined schedule of such spark retard values, wherein the schedule is stored in non-volatile memory of controller 30 (FIG. 1) in the form of a conventional lookup table as a predetermined function of catalytic converter 44 (FIG. 1) catalyst temperature. In this embodiment, the temperature of the catalyst of converter 44 is estimated through execution of the routine of FIG. 10.

After referencing a maximum retard value, the routine moves to a step 540 to determine if a first injector INJ1 has been disabled, such as to provide a reduction in engine output torque. If so, the maximum retard referenced at the step 272 may be increased by a predetermined amount at a step 542, such as about ten degrees of retard in this embodiment. Next, or if INJ1 is not off as determined at the step 540, the routine moves to a step 544 to determine if a second injector INJ2 has been disabled, such as to provide a reduction in engine output torque. If INJ2 is determined to be off at the step 544, the maximum retard as referenced at the step 272 may be further increased at the step 546. The increase in spark retard limit that is provided at either or both of the steps 542 and 546 provides for an increase in the authority of the spark timing adjustment in reducing engine output torque, as more retard may be tolerated without catalyst damage in converter 44, due to the disabled cylinders corresponding to the disabled injectors acting as an air pump, passing substantially fresh air to the converter 44. The schedule of maximum retard values referenced at the step 272 does not contemplate such disabled cylinders in this embodiment. Accordingly, when a maximum retard value is referenced from the schedule, it is adjusted to reflect the status of any injectors that may be disabled, so as to provide a maximum degree of spark or ignition timing authority in controlling wheel slip conditions without catalyst damage, as described. After adjusting the maximum retard limit through step 540–546, the routine proceeds to the steps 276–318 of FIGS. 8a and 8b in the manner described for FIGS. 8a and 8b of the patent incorporated herein.

Figure 8A:
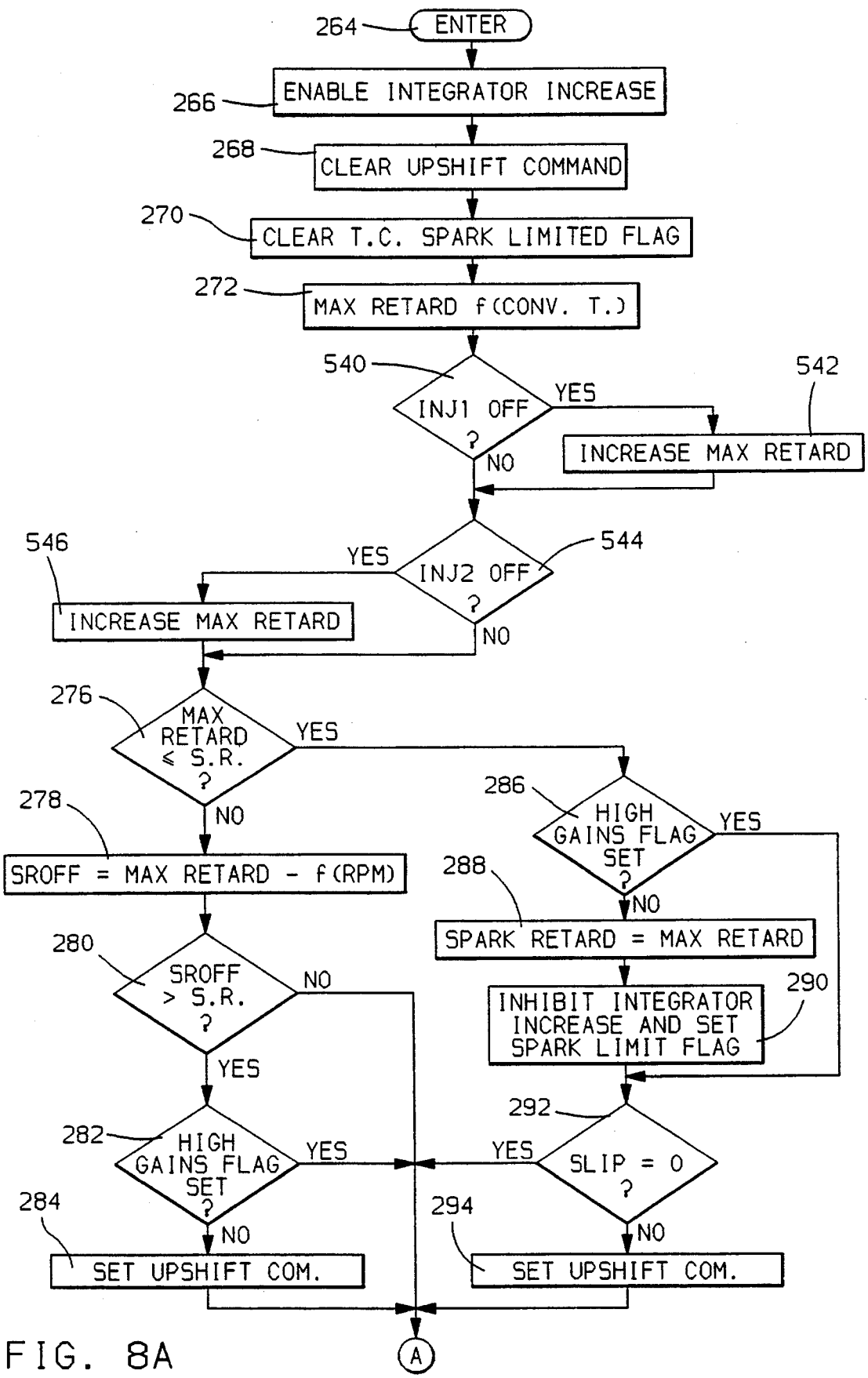
Figure 8B:
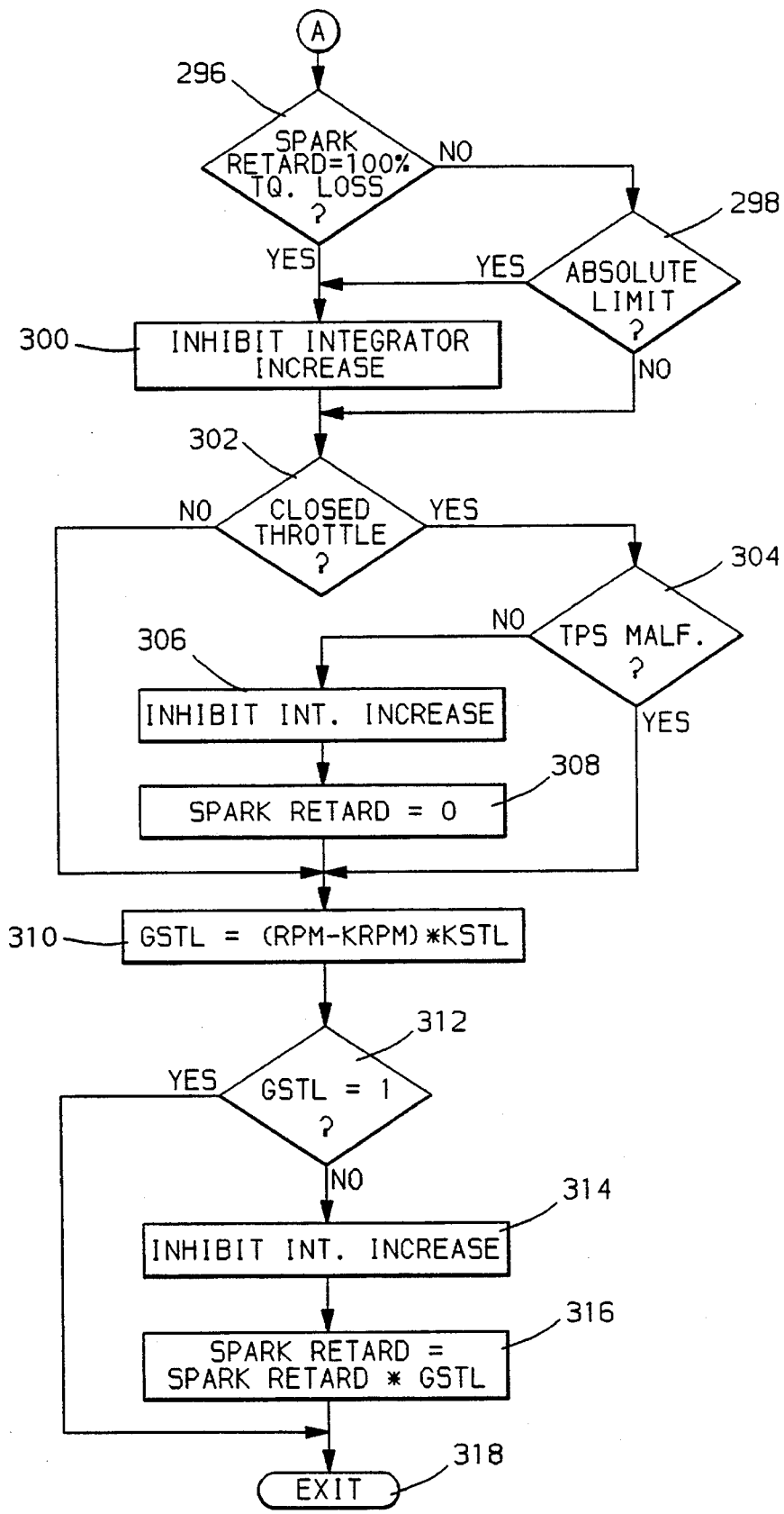
Figure 9B:
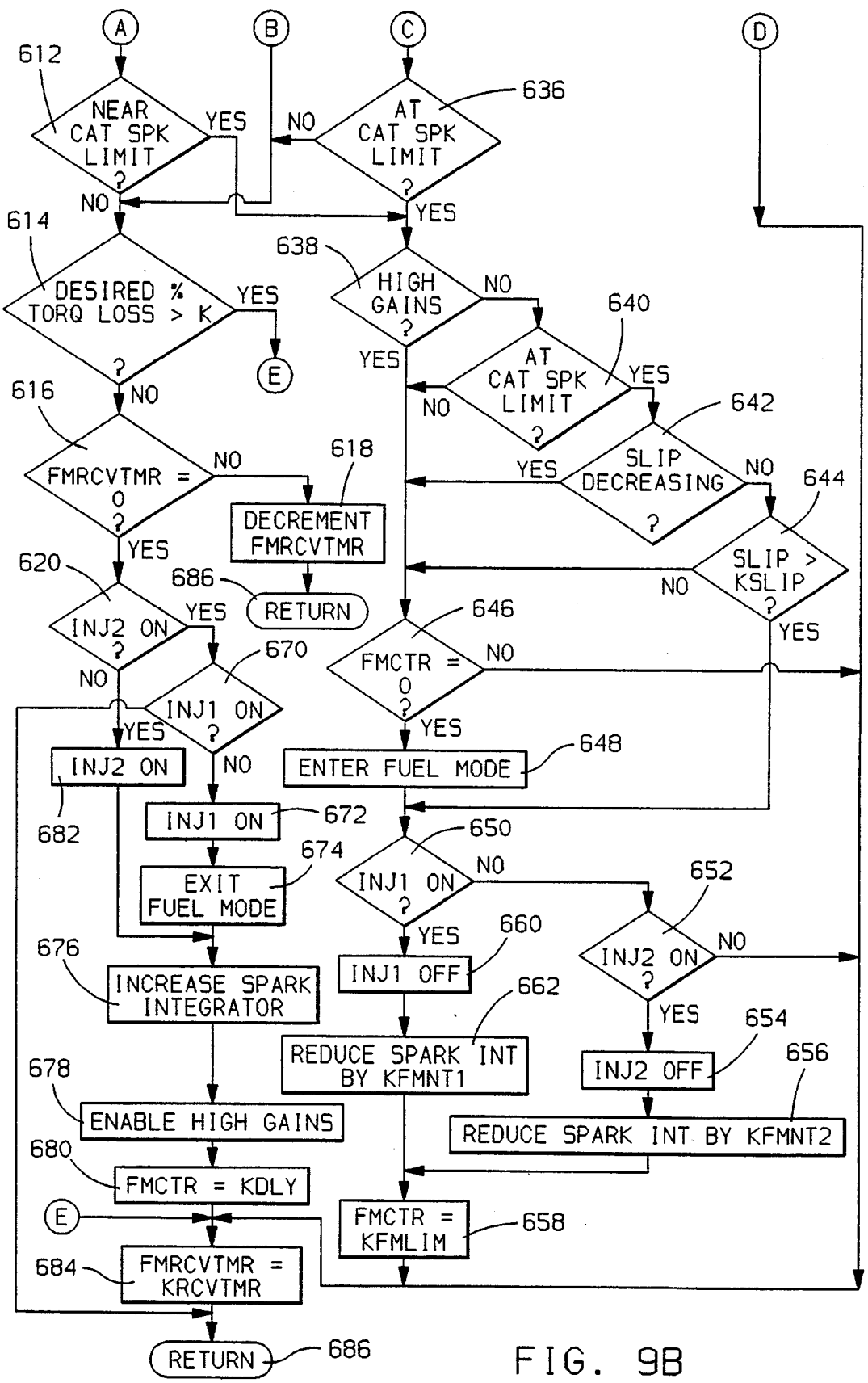

After completing the routine of FIGS. 8a and 8b, the routine of FIG. 2 is re-entered and moves to a step 100 to execute a traction control fuel mode routine illustrated in FIGS. 9a and 9b. The traction control fuel mode routine is also executed following execution of the described step 98. When initiated the routine of FIGS. 9a and 9b is entered starting at a step 560 and proceeding to a step 562 to decrement a fuel mode counter FMCTR. The routine then proceeds to a routine 564 to determine if the transmission 14 of FIG. 1 has been upshifted manually by the vehicle operator since the last iteration of the routine of FIG. 9. An upshift may be indicated by setting a flag in ECM 30 random access memory for a period of time after an upshift operation. If an upshift is indicated at the step 564, the routine proceeds to turn on any injectors that may have previously been disabled to provide a traction control-based engine output torque reduction, and to reduce spark retard so as to smooth the torque transition corresponding to the gear change.

Specifically, upon detecting an upshift at the step 564, the routine proceeds to a step 566 to determine if any injectors have been turned off through the operation of the traction control of this embodiment. If any injectors are turned off at the step 566, the routine proceeds to a step 568 to set the delay counter FMCTR such as may be stored in ECM random access memory to a calibrated predetermined value KDLY. The value KDLY is the amount of time allowed between disabling or turning off of individual injectors, wherein injectors that are to be disabled in accord with the desired torque reduction of the traction control of this embodiment will not be turned off more quickly than one injector for every KDLY period of time, to allow any injectors that are not turned off sufficient time to reduce any detected slip condition.

Figure 6A:
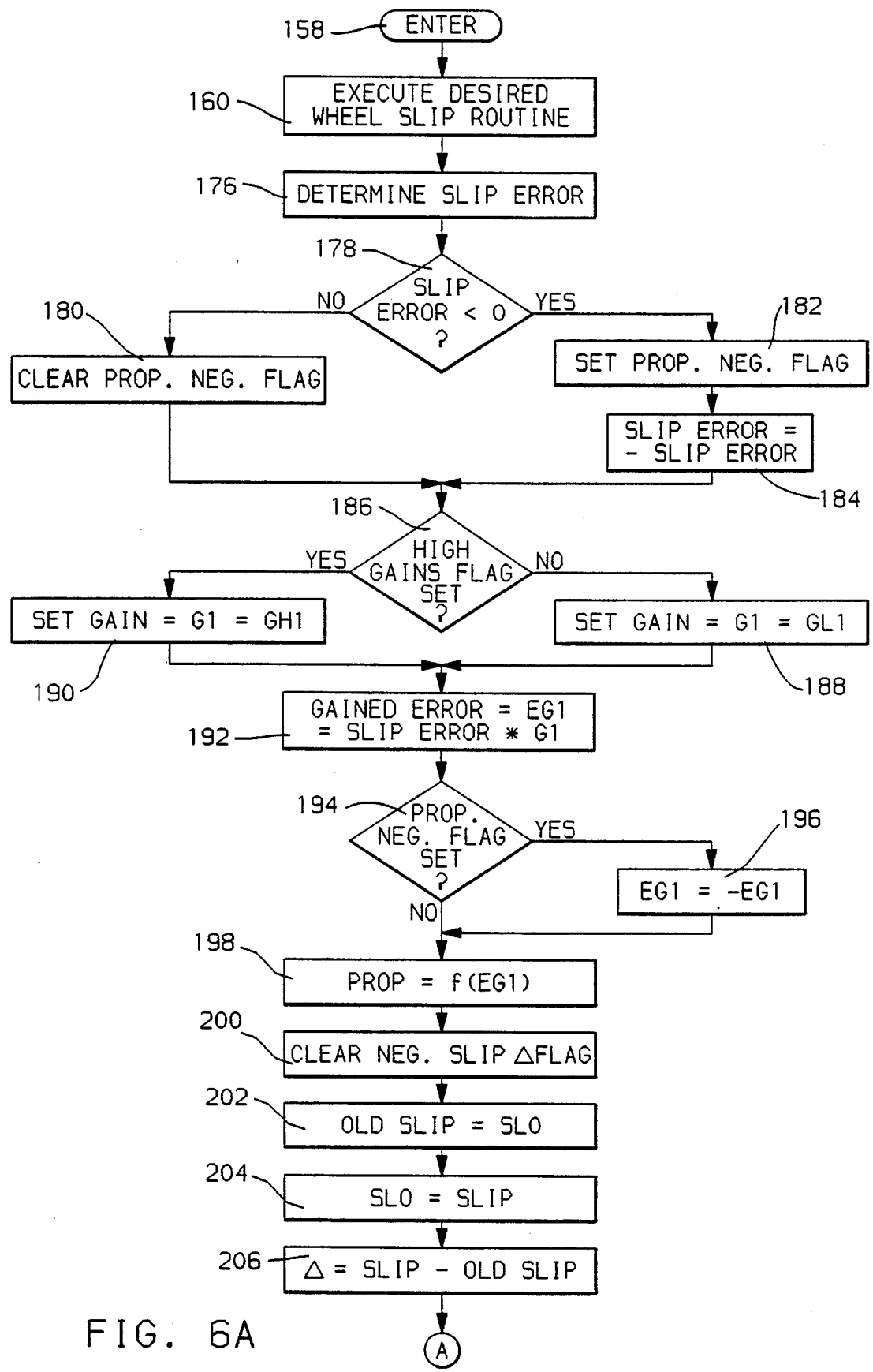
Figure 6B:
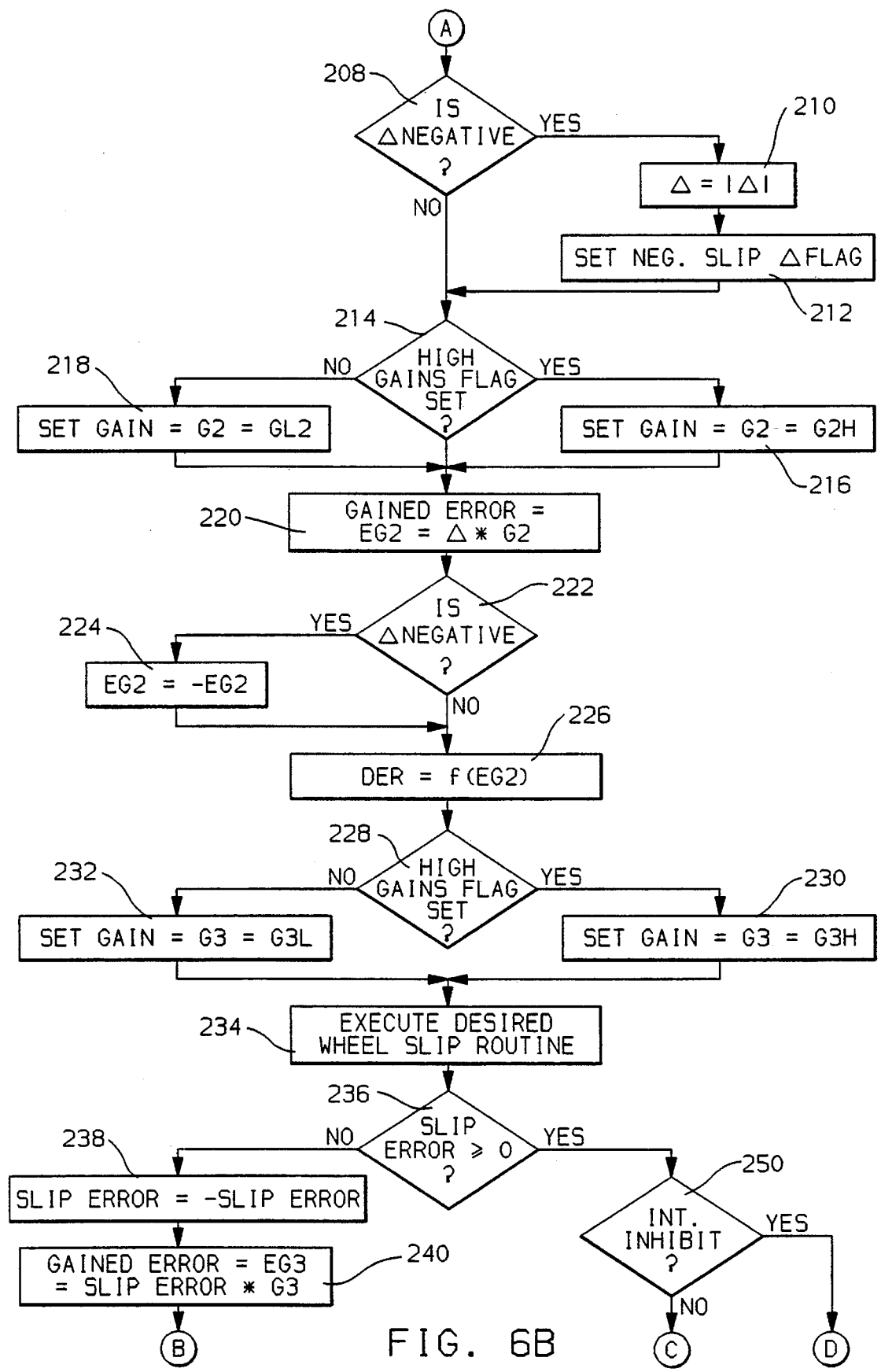
Figure 6C:
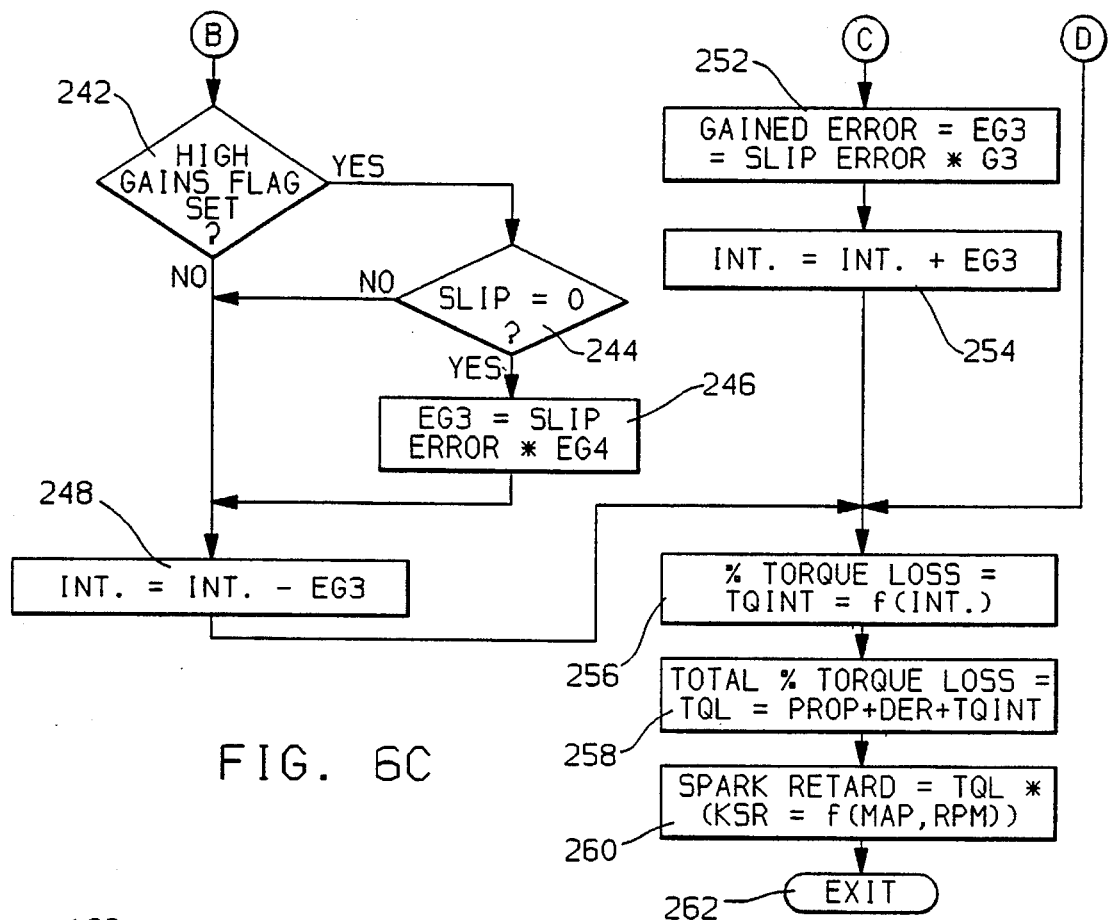
Figure 7:
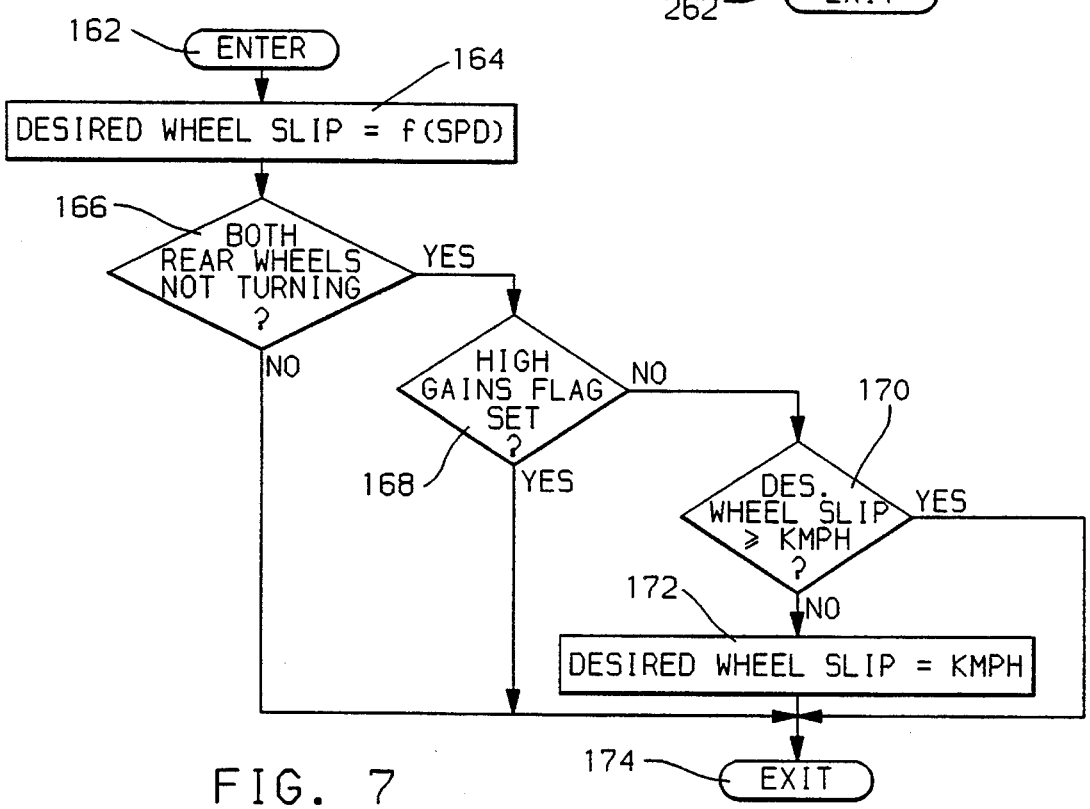

After setting the counter to KDLY at the step 568, the routine proceeds to a step 570 to enable any injector that may have been turned off, including injectors INJ1 and INJ2 of this embodiment, and then proceeds to a step 572 to enable high gain values, such as by setting a high gains flag used in the PID routine of FIGS. 6a14 6c of this embodiment. Next, or if no injectors were determined to be off at the step 566, the routine proceeds to a step 574 to reduce a spark integrator to smooth the gear transition detected at the step 564. The amount of the spark integrator reduction may be calibrated to provide a smooth transition upon detection of the gear change while retaining the slip reduction benefits provided through this routine. Next the routine proceeds to a step 684, to be described.

Returning to the step 564, if an upshift has not been detected, the routine proceeds to a step 576 to compare engine speed RPM to a low RPM value LOWRPM which is set to approximately 1100 revolutions per minute in this embodiment. If engine speed is less than LOWRPM at the step 576, the engine may be approaching an undesirable stall condition, a remedy for which may be provided by next proceeding to the steps 578–592. At the step 578, a determination is made whether the injector INJ2 is on. The fuel injector INJ2 in this embodiment is the second fuel injector to be disabled for an engine output torque reduction. If INJ2 is determined to be on at the step 578, the routine proceeds to a step 580 to compare engine speed RPM to a minimum engine speed value MINRPM set to approximately 600 revolutions per minute in this embodiment. If engine speed RPM is less than MINRPM at the step 580, a stall condition is diagnosed and again the routine proceed attempts to remedy the stall condition by enabling fuel injectors that may have been disabled in the traction control of the present embodiment. First, the routine proceeds from the step 580 under the stall condition to a step 582 to determine if fuel mode is active. If fuel mode is active, the routine proceeds to a step 584 to increase the spark integrator to increase the engine output torque at the driven wheels to smooth the transition from a disable fuel mode to an enable fuel mode, and then proceeds to a step 586 to reset the counter FMCTR to the value KDLY such as in the manner described in the manner 568. Next, or if the fuel mode was not detected to be enabled at the step 582, the routine proceeds to a step 594 to enable any currently disabled injectors, after which the routine proceeds to a step 596 to exit fuel mode, such as by clearing a fuel mode enable flag. The routine then proceeds to a step 686 at which it is directed to return to the routine of FIG. 2 from which it was called.

Returning to the step 578, if injector INJ2 is determined to not be on, the routine proceeds to a step 588 to turn on INJ2, such as by setting an injector 2 enable flag in ECM memory, which flag is used in generally engine control for issuing fuel commands to injectors which have enable flags that are set. The routine then proceeds to a step 590 to increase a spark integrator used in the PID routine of FIGS. 6a–6c of this embodiment, to increase the spark retard magnitude by approximately 25% to provide for a torque loss swap between fuel and spark, minimizing the magnitude of torque increase corresponding to the re-enabled injector. The routine next proceeds to a step 592 to set the counter FMCTR to the value KDLY to provide for a delay before any further fuel recovery is provided. The routine then proceeds to the described step 686.

Returning to step 580, if engine speed RPM is not less than the minimum engine speed MINRPM, such that a stall condition is not diagnosed to be present, or if engine speed is determined to not be below the LOWRPM engine speed at the step 576, the routine proceeds to a step 598 to compare throttle position TP to a predetermined calibration throttle position value TPmin, which is set to a value slightly greater than zero, so that a determination may be made as to whether the throttle is substantially closed. If the throttle is not substantially closed at the step 598, the routine proceeds to a step 602 to compare coolant temperature TEMP to a calibrated threshold temperature value KTMP which is set to a relatively low temperature value through a conventional calibration process to indicate when coolant temperature is sufficiently low that fuel injectors should not be disabled, as they may affect the engine speed control stability.

If throttle position is substantially closed, or if the engine coolant temperature is sufficiently cold that fuel injectors should not be disabled, as determined at the respective steps 598 and 602, the routine proceeds to a step 600 to clear the fuel mode counter FMCTR to provide for a rapid turn on of all fuel injectors that are currently disabled, and the routine proceeds to the described steps 594 and 596 to turn on any disabled fuel injectors and to exit the fuel mode, after which the routine proceeds to the described step 686.

Alternatively, if throttle position is not substantially zero as determined at the step 598 and coolant temperature is not significantly low as determined at the step 602, the fuel mode operations continue by proceeding to a step 604 to determine transmission type. Such determination may be made by examining a non-volatile memory location to which is assigned a value corresponding to the type of transmission installed in the vehicle. In this embodiment, the transmission is of the manual type, as described. In this manner, the routine of FIG. 9 provides for traction control in systems having either automatic or manual transmissions.

Specifically, at the step 604, a memory location in the ECM memory is examined to determine the transmission status of the present embodiment. If the transmission is an automatic transmission, the routine proceeds to steps 606–610 to examine conditions for entry into the fuel mode in which fuel cut-off may be used for driven wheel torque reduction. These conditions are provided to prevent torque adjustments through fuel control from operating until automatic transmission upshift activities have had ample time to provide a torque adjustment. If the transmission is a manual transmission, such delay of fuel control is not necessary, and the entry conditions of steps 606–610 are not examined. In such case, the routine proceeds from step 604 to a step 612 to determine whether the current spark retard is near, such as within a predetermined spark angle of the spark retard limit used to protect the catalyst from the described over temperature condition. If near the limit at the step 612, the routine proceeds to a step 638, to be described.

If not near the limit at the step 612, the routine proceeds to a step 614 to carry out a series of steps to recover from any fuel cutoff condition that may be present, by a staged re-enabling any disabled injectors. Specifically, the routine proceeds first to the step 614 to determine if the amount of desired torque loss is less than a threshold value K wherein K is a value set substantially at zero. The desired percent torque loss is a value established at the step 258 of the routine of FIG. 6a–6c in the PID control as the amount of desired torque loss to be delivered through spark retard. The step 614 is provided to determine whether the spark retard requirement to reduce engine output torque is substantially zero, wherein disabled injectors will not normally be re-enabled until the spark retard requirement is substantially zero, to provide for a smooth recovery from a condition of reduced engine output torque.

If the desired torque loss is greater than the threshold value K at the step 614, the routine proceeds to a step 684, to be described. Otherwise the routine proceeds to recover from the fuel cut-off condition by proceeding first to a step 616 to determine if the fuel motor recovery timer has been reduced to zero, wherein the recovery timer FMRCVTMR is set up to establish a delay period between recovery of disabled fuel injectors. If the FMRCVTMR is not at zero at step 616, the routine proceeds to decrement it at a step 618 and then returns to any operations that were ongoing prior to the execution of the routine of FIG. 9 via the step 686. However, if FMRCVTMR is decremented to zero at the step 616, a fuel injector may be re-enabled and the routine proceeds to a step 620 to determine if injector INJ2 is currently on. If so, the routine proceeds to step 670 to determine if INJ1 is on. If INJ1 is not on it is re-enabled at the step 672 to provide for fuel mode recovery, such as by setting a flag at an appropriate location in controller 30 (FIG. 1) memory so that normal injection may resume at injector INJ1, after which the routine proceeds to step 674 to exit the fuel mode, such as by clearing a fuel mode active flag in ECM memory. Returning to the step 620, if INJ2 is on and INJ1 is on at the step 670, the routine proceeds to the described step 686. However, if INJ2 is not on as determined at the step 620, the routine proceeds to enable INJ2 such as by setting a flag in an appropriate location in controller 30 (FIG. 1) memory so that normal fuel injection may resume at the injector INJ2 in accord with generally understood fuel control practices.

Next, or if fuel mode was exited at the step 674, the routine proceeds to a step 676 to increase a spark integrator used in the PID control routine of FIGS. 6a–6c, to provide a strategic torque reduction through spark retard to offset the significant torque increase corresponding to the re-enabled fuel injector in accord with the smooth integrated traction control approach of the present invention. The routine then proceeds to a step 678 to enable high gains for the PID control of the routines of FIGS. 6a–6c at a step 678, and then proceeds to a step 680 to set the fuel mode counter to the value KDLY such as was described at the step 568, and then proceeds to the step 684 to set the fuel mode recovery timer to a threshold recovery timer value KRCVTMR to provide for a staged re-enabling of disabled injectors, so that fuel injectors are disabled gradually to allow a smooth transition into and out of the fuel mode and to allow for a smooth slip condition recovery in accord with an advantage of this invention. Next the routine proceeds to the described step 686.

Returning to the step 604, in the embodiment of this invention in which an automatic transmission is provided, the routine proceeds from step 604 to the steps 606–610 as described to examine fuel mode entry conditions which are provided to indicate whether ignition timing and transmission gear position values are approaching the limits of their authority, such that activation of fuel control may be necessary. These entry conditions include the condition at the step 606 in which wheel slip is compared to an threshold KSLP to indicate the presence of a significant wheel slip condition, the step 608 at which the high gain as used in the PID control of the routine of FIG. 6a–6c must not be present to enter fuel mode, and a step 610 to determine if the wheel slip is decreasing. The condition of wheel slip decreasing indicates that current traction control action is effectively reducing wheel slip so that further action, such as entering the fuel mode, may not be currently necessary. If any of the entry conditions are not present, the fuel mode is not entered, and the previously described fuel cutoff recovery is provided, beginning with the described step 614. However, if all of the entry conditions are present, a final entry condition is examined at the step 636 at which the current commanded spark retard is compared to the catalytic converter protection-based spark retard limit value.

If the spark retard is at the limit value, indicating that spark retard has run out of authority to reduce wheel slip, the final condition for entry into the fuel mode has been met and the routine proceeds to a step 638 to initiate entry into the fuel mode. As described, the fuel mode is also entered if, for a manual transmission application, the commanded spark retard is near the spark limit value as described at the step 612. Accordingly, the steps provided for entry into fuel mode are executed for both manual transmission applications and automatic transmission applications starting at a step 638. First, a set of entry conditions are examined at steps 638–644. These conditions correspond to the entry conditions examined in the automatic transmission application of this invention at the described steps 606–610 and 636. A redundant examination of these conditions is thus provided for the automatic transmission application of this invention. However, such conditions need be examined for the manual transmission application of this invention and thus are provided as steps 638–644. If these entry conditions indicating a loss of authority are met, the fuel shut-off provided by the fuel mode is executed immediately without any delay. However if any of the conditions are not present the fuel shut-off is provided in a gradual manner through a timer operation as will be described.

Specifically at the step 638, if the high gains are not active, indicating that ignition control has been active for a significant period of time, if at the spark retard limit at the step 640, if the slip is not decreasing at the step 642 such that the current torque reduction approach is not adequately compensating for the detective slip condition, and if the slip value exceeds the threshold KSLP indicating a significant slip condition is present at the step 644, the routine proceeds to a step 650 to initiate a fuel shut-off activity without delay, as will be described. However, if any of these conditions are not met, fuel shut-off is provided gradually by proceeding first to a step 646 to determine if the fuel mode counter FMCTR has been decremented to zero. If FMCTR is not at zero, the delay between shut-off of injectors has not elapsed, and therefore the routine avoids the fuel shut-off by proceeding directly to the described step 684. However, if FMCTR is at zero at the step 646, fuel shut-off may be carried out by proceeding to a step 648 to enter the fuel mode, such as by setting a fuel mode active flag in ECM memory. The routine then executes a step 650 to determine if injector INJ1 is currently on. If INJ1 is on, such as indicated by the value of its enable flag in ECM memory, the routine proceeds to a step 660 to disable INJ1, such as by clearing such flag in ECM memory. The routine then moves to execute a step 662 to reduce a spark integrator by a predetermined amount KFMNT1 to reduce spark retard to provide for a torque loss swap between spark retard and fuel to provide for a smooth transition to the INJ1 shut-off condition. The routine then proceeds to a step 658 to set FMCTR to the limit value KFMLIM to provide for a resetting of the fuel mode counter to delay the time before the next fuel injector may be shut off. Next, the described step 684 is executed.

Returning to step 650, if INJ1 is determined to not be on, the routine proceeds to a step 652 to analyze a second injector INJ2, wherein INJ2 may also be disabled to provide for a further torque reduction for wheel slip recovery. If INJ2 is on at the step 652, the routine proceeds to a step 654 to disable INJ2, such as by adjusting a value in an appropriate location in ECM memory. The routine then proceeds to a step 656 to reduce the spark integrator by a value KFMNT2 to provide for a torque loss swap between fuel and spark to reduce the impact of the transition to the INJ2 off condition, to provide for smooth traction control in accord with this invention. The routine then proceeds to the described step 658.

Alternatively at the step 652, if INJ2 is not on, no further fuel cut-off is provided in this embodiment and the routine proceeds directly to the described steps 684. In an alternative embodiment of this invention, additional fuel injectors may be disabled beyond the two injectors INJ1 and INJ2, to provide additional torque control authority in accord with this invention. For example, after having disabled INJ1 and INJ2 as described in this embodiment, an injector INJ3 may be disabled if spark retard angle is determined to be at or approaching the described spark retard limit value. After disabling INJ3, adjustment may be made to the spark integrator and the spark limit value in the manner described following the disabling of INJ1 and INJ2 in the preferred embodiment. If spark retard angle again approaches or reaches the spark retard limit value, an additional injector, say INJ4, may be disabled, and so on. A limit on the number of injectors that may be successively disabled in this manner in response to wheel slip error should be dictated through a calibration of the system, to provide coverage of virtually all typical wheel slip conditions without materially reducing vehicle driveability. In applications with more engine cylinders, such as eight or twelve cylinder engine applications, an increased limit would be appropriate, such as a limit of four or even six cylinders, while a smaller limit, such as to two cylinders would likely be suitable in four cylinder engine applications.

Returning to the preferred embodiment, through the gradual fuel shut-off control described in the FIG. 9, a smooth control of torque loss is provided having sufficient authority to provide responsive wheel slip control in accord with traction control of this invention, and yet to provide for smooth slip control wherein rather than shutting off a significant number of injectors at the same time, single injectors are shut off in a staged manner using a delay, such as delay FMCTR of the present embodiment, provides for a spacing in time between the shutting off of individual injectors. Furthermore, in extreme wheel slip conditions, the delay may be bypassed and immediate fuel shut off of injectors provided to provide a more responsive fuel shut-off operation. Furthermore, a single control routine may be used to provide for such fuel control in both automatic transmission applications and manual transmission applications to provide a more comprehensive traction control approach than previously was available.

Still further, torque loss swap between fuel and ignition retard is provided to provide for smooth yet integrated traction control. For example, when any of a number of fuel injectors is disabled, the torque input determined through spark timing retard is increased by decreasing the retard, to allow for more gradual torque loss than the relatively granular loss associated with disabling a fuel injector. Through the gradual operation of the PID control of this embodiment, the spark retard may then be gradually increased to increase the torque loss at the driven vehicle wheels. The torque loss swap is also provided upon recovering from a fuel injector shut-off condition wherein when an injector is re-enabled, spark retard may be increased dropping the torque contribution provided by the spark retard at about the same time the torque contribution from fuel is increasing significantly. The result is a smooth recovery from a disabled injector or injectors condition.

Figure 10:
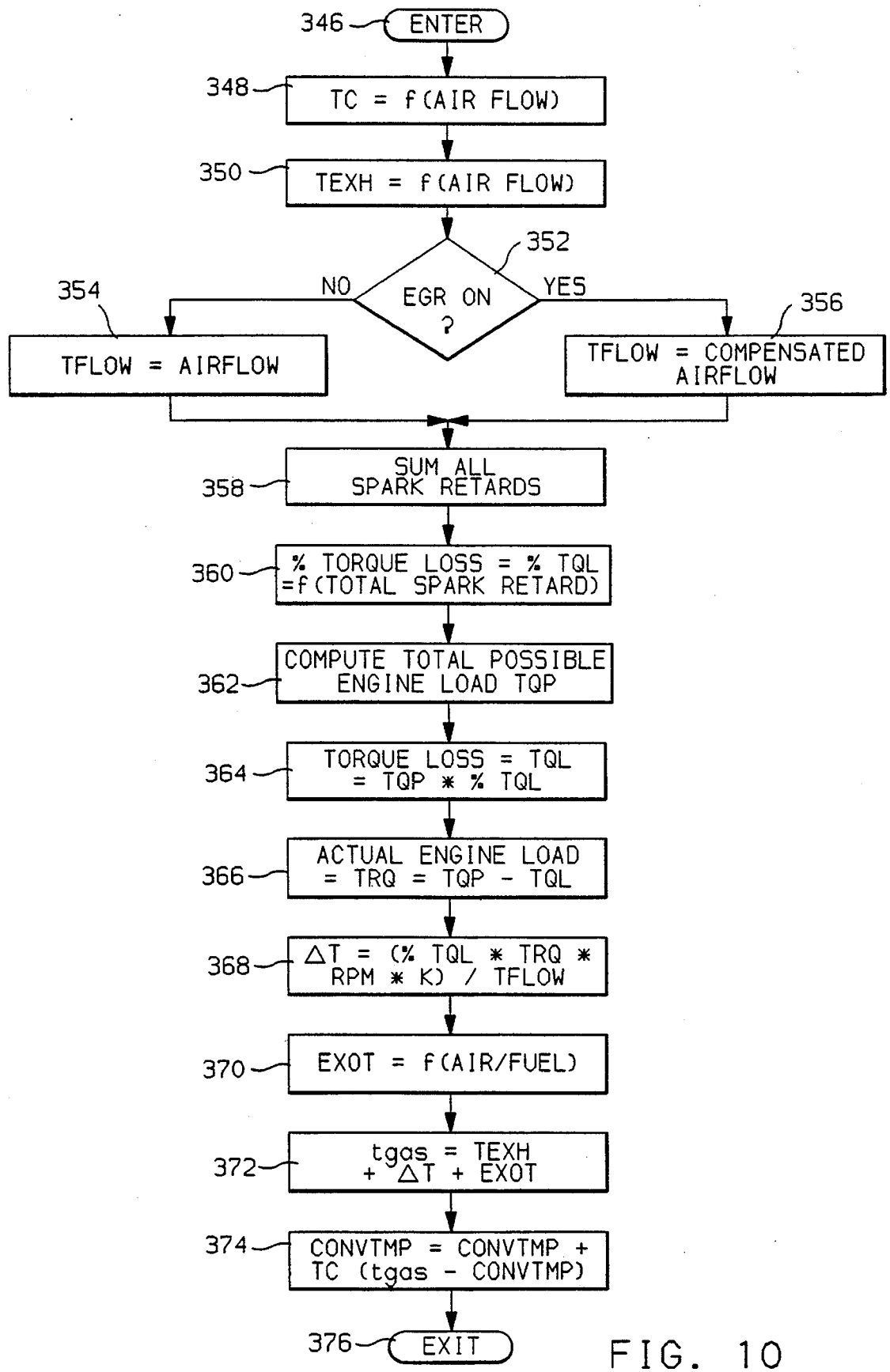

Referring to FIG. 10, the routine for estimating the temperature of the catalyst in the catalytic converter 44 of FIG. 1 is illustrated. This estimated temperature is used in the determination of the spark retard limit MAX RETARD for prevention of a catalytic converter overtemperature condition, as described. This routine is periodically executed through operation of a conventional time-based controller interrupt, such as approximately every 200 milliseconds while the ECM 14 of FIG. 1 is operating. The estimation of the routine of FIG. 10 is based on a catalyst model using an exhaust temperature term Texh, an exotherm term EXOT and a $\Delta T$ term that is a function of spark retard. The specific steps used to carry out the routine of FIG. 10 are as illustrated in FIG. 10 of the patent incorporated herein by reference.

An application of the present invention including an automatic transmission coupled to the engine 10 of FIG. 1 may include the routines of FIGS. 11–15 of the patent incorporated herein to provide for the operation of a transmission control module (not shown) which controls the gear that is active in the automatic transmission. As is fully detailed in the incorporated patent, the integrated control applicable only to an automatic transmission described in the incorporated patent provides for transmission upshift and downshift control at appropriate times for torque reduction at the vehicle driven wheels in accord with the integrated action of spark, transmission, and fuel, to provide for wheel slip recovery. In the present invention, applicable to both manual and automatic transmission applications, the transmission upshift and downshift routines of FIGS. 11–15 of the incorporated reference may be included in the automatic transmission application working with the FIGS. 1–9 described herein, and such routines 11–15 are not to be included in the manual transmission applications hereof. The present embodiment, including a manual transmission application, does provide for any transmission gear change initiated by manual vehicle operator action, by re-enabling any disabled injectors and reducing the spark integrator upon any detected upshift operation by the vehicle operator, so as to benefit from any vehicle operator initiated transmission gear change by providing for a torque swap between the action of the transmission gear change and the fuel and spark actions that may be ongoing at the time of such gear change, as described at the steps 564–574 hereof.

The preferred embodiment for explaining this invention is not to be taking as limiting or restricting this invention since many modifications may be made through the exercise of ordinary skill in the art without departing from the scope of this invention.

The embodiments of the invention in which a property or privilege is claimed are described as follows:

1. A traction control method for reducing a detected wheel slip condition in driven wheels of an automotive vehicle having an internal combustion engine fueled by a plurality of fuel injectors, wherein fuel admitted to the engine is combusted following ignition signals issued at times corresponding to a spark timing value, comprising the steps of:

determining a slip condition in the driven wheels;

adjusting the spark timing value in a retard direction corresponding to a decreased engine output torque to reduce the determined slip condition;

determining when the adjusted spark timing value exceeds a predetermined limit value;

disabling a predetermined one of the plurality of fuel injectors upon determining that the adjusted spark timing value exceeds the predetermined limit value to decrease engine output torque and reduce the determined slip condition; and adjusting the spark timing value in an advance direction opposing the retard direction upon disabling the predetermined one of the plurality of fuel injectors to mitigate the decrease in engine output torque resulting from such disabling.

2. The method of claim 1, further comprising the step of:

increasing the predetermined limit value in accordance with a predetermined limit increase amount upon disabling the predetermined one of the plurality of fuel injectors.

3. The method of claim 1, further comprising the steps of:

determining catalytic converter temperature; and establishing the predetermined limit value as a predetermined function of the determined catalytic converter temperature.

4. The method of claim 3, further comprising the step of:

increasing the established limit value in accord with a predetermined limit increase amount upon disabling the fuel injector.

5. The method of claim 1, further comprising the steps of:

detecting when the determined slip condition is not significantly reduced through the engine output torque decrease provided through the disabling of the predetermined one of the plurality of fuel injectors;

further adjusting the spark timing value in the retard direction upon detecting that the determined slip condition is not significantly reduced;

determining when the further adjusted spark timing value exceeds the predetermined limit value;

disabling a predetermined additional one of the plurality of fuel injectors upon determining that the further adjusted spark timing value exceeds the predetermined limit value; and further adjusting the spark timing value in an advance direction opposing the retard direction upon disabling the additional one of the plurality of fuel injectors, to mitigate the decrease in engine output torque resulting from the disabling of the additional one of the plurality of fuel injectors.

6. The method of claim 5, further comprising the steps of:

increasing the predetermined limit value in accord with a predetermined additional limit increase amount upon disabling the additional one of the plurality of fuel injectors.

7. The method of claim 1, further comprising the steps of:

sensing an upshift operation of a transmission coupled to the engine;

enabling the disabled one of the plurality of fuel injectors upon sensing the upshift operation; and adjusting the spark timing value in a retard direction upon enabling the disabled fuel injector.

8. The method of claim 1, further comprising the steps of:

sensing a recovery from the determined slip condition;

enabling the disabled one of the plurality of fuel injectors upon sensing the recovery; and adjusting the spark timing value in the retard direction upon enabling the disabled one of the plurality of fuel injectors to mitigate the increase in engine output torque resulting from such enabling of the disabled one of the plurality of fuel injectors.

9. A method for adjusting engine output torque in response to a determined slip condition in driven wheels of an automotive vehicle having an internal combustion engine the output torque of which may be varied by selectively enabling and disabling any of a plurality of fuel injectors for injecting fuel to the engine and by varying timing of a spark command issued to ignite the injected fuel, comprising the steps of:

detecting a driven wheel slip condition;

retarding the timing of the spark command to relieve the detected slip condition;

comparing the timing of the spark command to a predetermined retard limit value;

discontinuing the fuel injection operation of a predetermined one of the plurality of fuel injectors when the timing of the spark command exceeds the retard limit value;

advancing the timing of the spark command by a predetermined advance angle upon discontinuing the fuel injection operation;

increasing the predetermined retard limit value by a predetermined increase value upon discontinuing the fuel injection operation;

comparing the timing of the spark command to the increased predetermined retard limit value after the discontinuing of the fuel injection operation;

discontinuing the fuel injection operation of a predetermined additional one of the plurality of fuel injectors when the timing of the spark command exceeds the increased predetermined retard limit value;

advancing the timing of the spark command in accord with a predetermined additional advance angle upon discontinuing the fuel injection operation of the predetermined additional one; and increasing the predetermined retard limit value in accord with a predetermined additional increase value upon discontinuing the fuel injection operation of the predetermined additional one.

10. The method of claim 9, further comprising the steps of:

sensing a recovery from a driven wheel slip condition;

continuing operation of each disabled fuel injector in a sequential manner upon sensing the recovery;

retarding the timing of the spark command by a predetermined retard angle following continuation of operation of each disabled fuel injector; and reducing the predetermined retard limit value in accord with a predetermined limit reduction value following continuation of operation of each disabled fuel injector.

11. The method of claim 9, further comprising the steps of:

sensing a transmission upshift operation;

continuing operation of each disabled fuel injector in a sequential manner upon sensing the upshift operation;

retarding the timing of the spark command by a predetermined retard angle following continuation of operation of each disabled fuel injector; and reducing the predetermined retard limit value in accord with a predetermined limit reduction value following continuation of operation of each disabled fuel injector.

12. The method of claim 9, further comprising the steps of:

generating a temperature value representing the temperature of a catalytic converter; and referencing the predetermined retard limit value as a predetermined function of the generated temperature value.

* * * * *